United States Patent [19]

King et al.

[11] 4,384,367

[45] May 17, 1983

[54] MDS RECEIVER

[75] Inventors: Charles T. King, Phoenix; Bernard E. Sigmon, Tempe, both of Ariz.

[73] Assignee: Theta-Com of California, Torrance, Calif.

[21] Appl. No.: 272,133

[22] Filed: Jun. 10, 1981

Related U.S. Application Data

[63] Continuation of Ser. No. 120,815, Feb. 12, 1980, abandoned.

[51] Int. Cl.³ ............................................. H04B 1/26
[52] U.S. Cl. ................................... 455/325; 455/131; 455/318; 455/333; 329/116
[58] Field of Search ............... 455/130, 325, 326, 327, 455/330, 333, 336, 337, 349, 313, 318, 319, 323, 331; 329/116, 122, 160

[56] References Cited

U.S. PATENT DOCUMENTS

| | | | |
|---|---|---|---|
| 3,649,937 | 3/1972 | Carlson | 455/325 |
| 3,671,868 | 6/1972 | Sanders | 455/325 |
| 3,699,454 | 10/1972 | Hudspeth | 455/325 |
| 3,737,784 | 6/1973 | Dostis | 455/325 |

FOREIGN PATENT DOCUMENTS 414769  8/1934  United Kingdom ................ 455/318

OTHER PUBLICATIONS

A Receiver for 144 MHz, by N. Davies, Radio Communication, vol. 52, No. 12, pp. 900-905, Dec. 1976.

*Primary Examiner*—Tommy P. Chin
*Attorney, Agent, or Firm*—William J. Benman, Jr.; Anthony W. Karambelas

[57] ABSTRACT

An improved low-cost microwave receiver is disclosed. The receiver is intended for use in the Multipoint Distribution Services (MDS) for the reception of television signals transmitted in the 2 to 2.5 GHz region. The receiver of the present invention is of the single-conversion superheterodyne type utilizing printed circuit and microstrip transmission line construction. Printed circuit board and microstrip transmission line construction permits low-cost fabrication without machined resonant cavities or waveguide components.

3 Claims, 5 Drawing Figures

MDS RECEIVER

This is a continuation of application Ser. No. 120,815, filed Feb. 12, 1980, now abandoned.

BACKGROUND OF THE INVENTION

1. Field of the Invention

This invention relates to high-frequency receivers and more particularly to receivers for the reception of television signals in the 2 to 2.5 GHz region.

2. Description of the Prior Art

As the use of television for entertainment and educational purposes has increased, the need for additional spectrum space has also increased in proportion. Partially, in an effort to meet this need, the Federal Communications Commission, in the early 1970's, set aside certain portions of the lower microwave region for metropolitan distribution of television signals for entertainment and education. The entertainment service known as MDS (Multipoint Distribution Service) has been assigned two "channels" between 2.15 and 2.16 GHz. Other channels in the same general region of the spectrum have been allocated for use by the educational service.

These services contemplate the use of a transmitter site in conjunction with widely spaced receiving sites. In the case of the MDS, the receiving sites typically correspond to CATV "head ends" or MATV receiver locations. Because of the potential widespread usage of the Multipoint Distribution Service and educational television, a market has developed for reliable, high quality, yet inexpensive television receivers operating in this frequency range.

In the past, military, governmental and common-carrier usage has generally dictated the design of microwave receivers. In general, such receivers have been built to standards which in many aspects are too exacting to permit economical mass production. For example, the machined waveguides, resonant cavities, micrometer-like tuning members, and the assorted "plumbing" utilized in many prior microwave receiver designs are often prohibitively expensive.

It is therefore an object of the present invention to provide a low-cost microwave television receiver utilizing no machined transmission line devices.

It is another object of the present invention to provide a microwave television receiver which utilizes "off-the-shelf" components and fabrication techniques which permit mass production.

It is yet another object of the present invention to provide a microwave television receiver of simplified design.

SUMMARY OF THE INVENTION

In keeping with the present invention, the above objects are accomplished by utilizing printed circuit board techniques wherein the printed circuit board is etched not only to provide the traces for discrete component interconnection, but also to provide microstrip transmission line elements. In particular, dual-sided printed circuit boards are used for both the microwave portion and VHF portions of the receiver circuits. In the microwave portion of the receiver, microstrip transmission lines are utilized as circuit elements. In the VHF and power portions of the circuit, the etched traces are used as conductors interconnecting circuit elements of the lumped parameter type.

In addition, a step recovery diode multiplier in conjunction with its distributed-parameter microstrip transmission line structures is used in place of the cavity resonator structures of the prior art. The resulting receiver, therefore, is easily adapted to mass production techniques of the type developed in conjunction with a low-frequency printed circuit board circuit fabrication.

BRIEF DESCRIPTION OF THE DRAWINGS

The above-mentioned and other features and objects of the present invention will become more apparent by reference to the following description taken in conjunction with the accompanying drawings. Wherein like reference numerals denote like elements and in which.

DESCRIPTION OF THE PREFERRED EMBODIMENT

Figure 1:
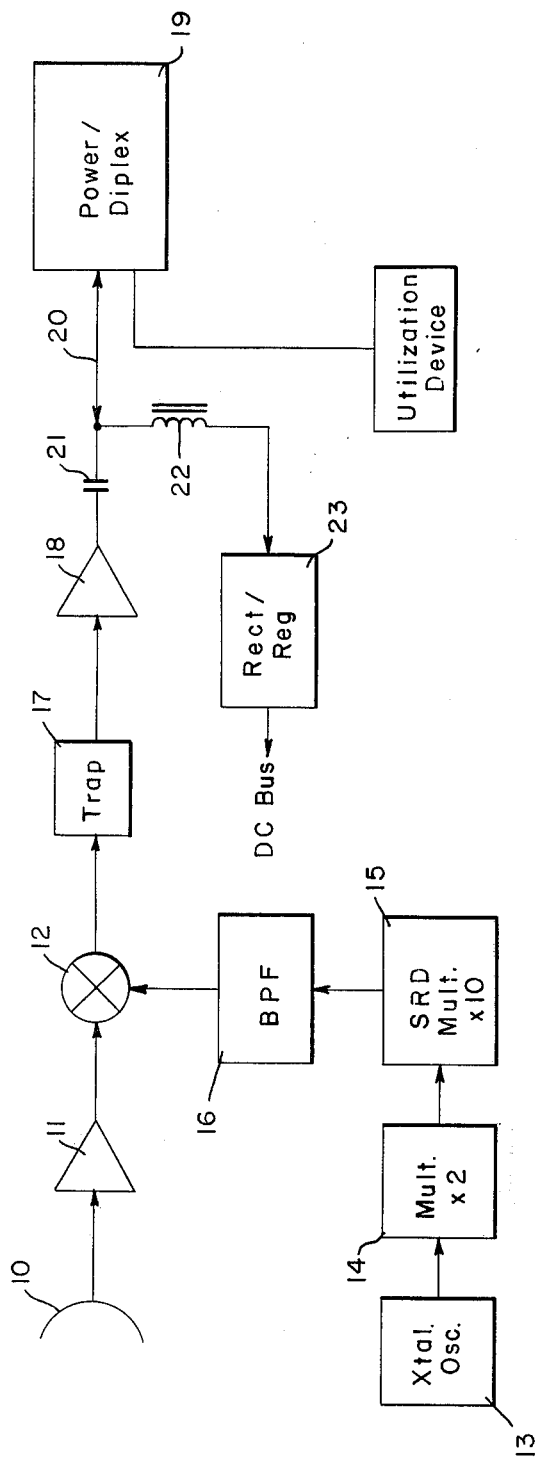
FIG. 1 is a simplified block diagram of a receiver in accordance with the present invention.

In FIG. 1 there is shown a simplified block diagram of an MDS receiver in accordance with the present invention. The receiver of FIG. 1 comprises a microwave receiving antenna 10 illustrated, for simplicity, as a parabolic reflector. A tuned rf preamplifier 11 is coupled to the output of antenna 10. The output of rf preamplifier 11 is, in turn, coupled to the rf input of mixer 12. The other input of mixer 12 is derived from the cascaded combination of crystal oscillator 13, frequency doubler 14, step recovery diode (SRD) multiplier 15 and bandpass filter 16. The output of mixer 12 is coupled through a local oscillator trap filter 17 to the input of a VHF amplifier 18. The output of VHF amplifier 18 is coupled through capacitor 21 and combination power supply/diplexer 19 to a utilization device.

The combination power supply/diplexer 19 provides a source of low voltage ac for powering the receiver of FIG. 1. The power supply portion is coupled by means of bidirectional transmission line 20 through rf choke 22 to a rectifier-regulator 23. The rectified and regulated direct current voltage is thereafter applied to a dc bus for powering the various circuits of the receiver.

In operation, video and audio modulated wave energy at a nominal carrier frequency of approximately 2.15 gigahertz (GHz) is intercepted by antenna 10 and amplified by tuned rf preamplifier 11 and applied to mixer 12. A crystal oscillator 13 operating at a nominal frequency of 115 MHz acting through frequency multiplier 14 and step recovery diode multiplier 15 provides the local oscillator signal to mixer 12. A bandpass filter 16, explained in greater detail hereinbelow, serves to pass only the preferred multiple from the step recovery diode multiplier and to block the return of undesirable mixer products from mixer 12.

The output of mixer 12, at a VHF frequency ordinarily corresponding to one of the commercial VHF television frequencies is coupled to a bandpass filter or trap filter 17. Trap filter 17 serves to pass only the desired mixer product to the input of VHF amplifier 18. VHF amplifier 18, which can comprise more than one stage of amplification, amplifies the VHF signal to a level suitable for use by the utilization device. Such a utilization device can comprise a commercial VHF television receiver in the case of a single user, or more typically, can comprise a VHF distribution amplifier for a multiple user installation.

Figure 2:
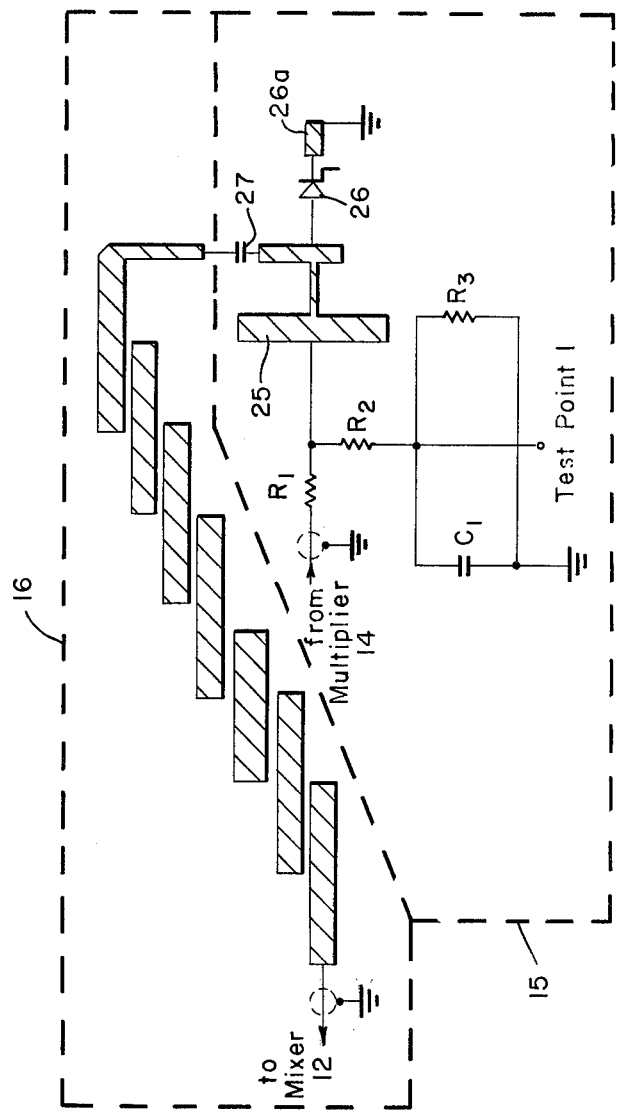
FIG. 2 is a schematic diagram of the step recovery diode multiplier-bandpass filter utilized in the receiver of FIG. 1.

Referring now to the schematic diagram of FIG. 2, there is shown the step recovery diode multiplier 15 and bandpass filter 16 of the present invention. All of the circuitry of FIG. 2 is conveniently disposed on one side of a dual-sided printed circuit board as will be shown in greater detail in FIG. 5. The portions of the circuit made up of the microstrip transmission line are shown cross-hatched. The discrete circuit elements are shown in their schematic form.

The step recovery diode portion 15 of FIG. 2 comprises a first input resistor $R_1$ connected between the input from multiplier 14 and a combination low-pass filter and matching structure 25. A second resistor $R_2$ is connected between the junction of resistors $R_1$ and low-pass filter-matching structure 25 with its other terminal being connected to Test Point 1. The parallel combination of a third resistor $R_3$ and capacitor $C_1$ is connected between Test Point 1 and ground.

Step recovery diode 26 is connected between combination low-pass filter-matching structure 25 and a grounded transmission line stub 26a. The frequency multiplied output derived from step recovery diode 26 is coupled through capacitor 27 to the input of the bandpass filter section 16. Bandpass filter 16 comprises a 5-pole filter of the coupled-line type. The output of filter section 16 is coupled by means of a coaxial transmission line to mixer 12.

The operation of step recovery diode (SRD) multipliers is well documented. In general, such multipliers comprise a signal source such as a sine wave generator which applies periodic energy to the step recovery diode. The step recovery diode and its resonant output circuit convert the input energy into a narrow, large amplitude voltage pulse that occurs once per input cycle. The energy in the pulse is used to shock excite an output resonant circuit which converts the impulse into a damped ringing waveform at the output frequency. This output energy is then filtered and delivered as a substantially pure sine wave.

Figures 3, 4:
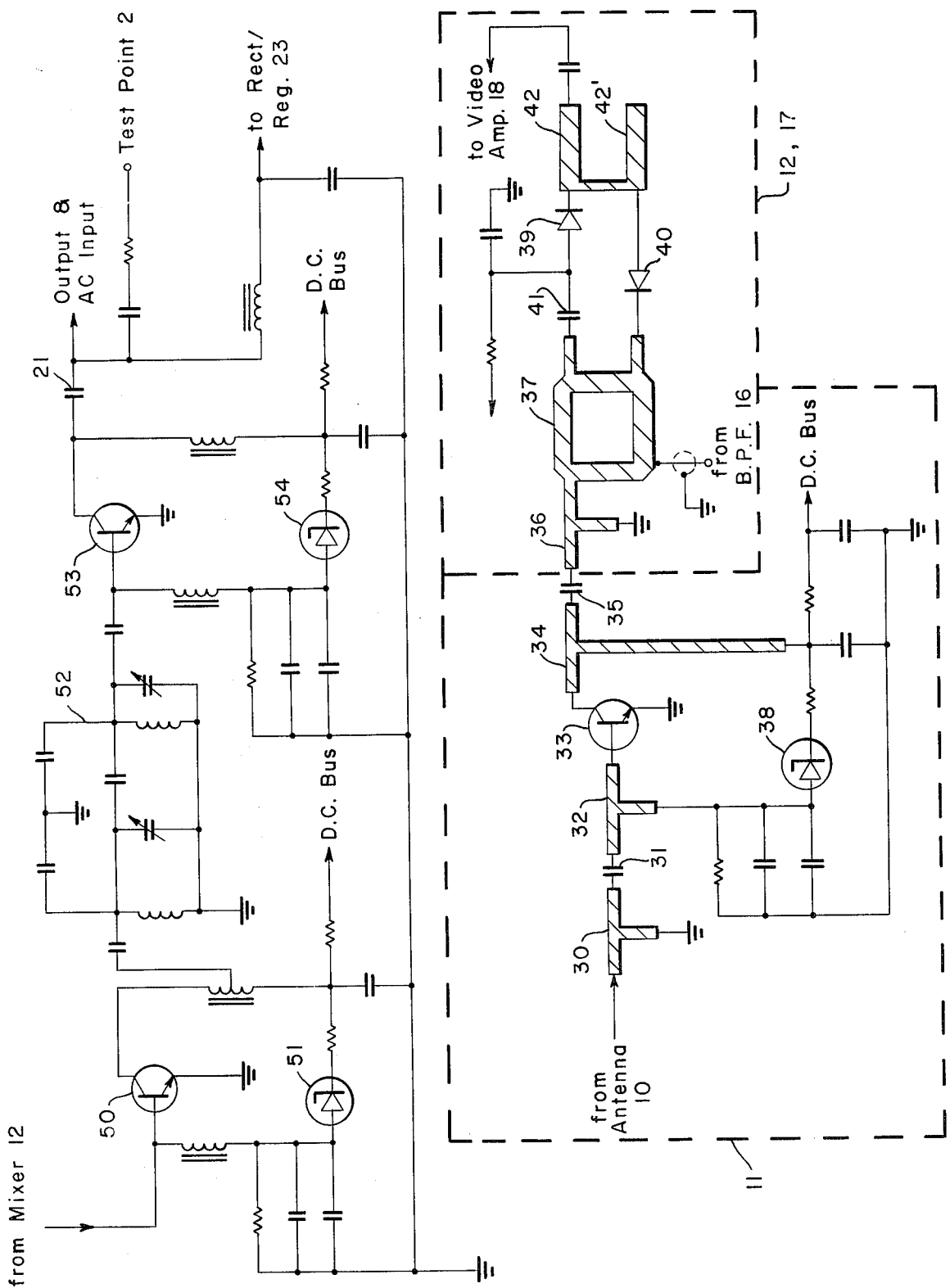
FIG. 3 is a schematic diagram of the rf amplifier and hybrid mixer utilized in the receiver of FIG. 1.
FIG. 4 is a schematic diagram of the two-stage VHF amplifier and output stages of the receiver of FIG. 1.

In FIG. 3 there is shown a schematic diagram of the tuned rf preamplifier 11 and mixer 12 of the receiver of FIG. 1. In FIG. 3, a first bandpass filter 30 including a shorted quarter-wave stub provides a tuned circuit for the rf wave energy from antenna 10. This bandpass filter section is coupled by means of capacitor 31 to an impedance matching section 32 to the base electrode of transistor 33. The collector of transistor 33 is connected by means of a low-pass filter 34, capacitor 35 and second bandpass filter structure 36 to the input of a quadrature hybrid circuit 37. Low-pass filter 34 provides a return path for the bias current of transistor 33, with the bias level being set by means of zener diode 38.

Local oscillator energy from the bandpass filter 16 of FIG. 2 is coupled to a second arm of quadrature hybrid network 37. Mixer diodes 39 and 40 are coupled to the output arms of hybrid 37 with diode 39 being isolated therefrom for biasing purposes by means of capacitor 41. The VHF output of the mixer is derived from one of a pair of open circuited quarter-wave transmission lines 42 and 42' connected to the opposite electrodes of diode 39 and 40.

The tuned rf preamplifier circuit is therefore a relatively straightforward grounded emitter amplifier with zener diode biasing. The bandpass filters 30 and 36 at the inputs of the preamplifier and mixer, respectively, are fabricated of microstrip transmission line as indicated by the cross-hatch. The same is true of matching sections 32, low-pass filter structure 34, quadrature hybrid 37 and open circuited transmission line stubs 42 and 42'. As indicated, all of these circuits are of microstrip construction wherein the circuit is etched or otherwise formed on one side of a dual-sided printed circuit board as will be seen in FIG. 5. The mixer is of the dual-diode balanced mixer configuration and is similar to that shown in an article entitled "Easy-to-Build SSB Transceiver for 1296 MHz", by H. Paul Scuch, appearing in *Ham Radio*, Sept. 1974 at pages 8 through 23.

In FIG. 4 there is shown, in schematic diagram a 2-stage VHF amplifier suitable for use with the receiver of FIG. 1. In FIG. 4, the output from mixer 12 is coupled to the base electrode of first-stage transistor 50. Transistor 50 is connected in a grounded emitter configuration and biased by means of zener diode 51 and its associated resistive-capacitive network. The collector electrode of transistor 50 is coupled by means of tunable interstage coupling network 52 to the base electrode of second-stage transistor 53. The second-stage transistor 53 is likewise biased by means of its zener diode 54. The output of the second stage is derived from the collector of transistor 53 and coupled through capacitor 21 to the combination power supply-diplexer arrangement of FIG. 1. An attenuated output for the second stage is also provided as Test Point 2.

As mentioned hereinabove, the low voltage ac input for powering the receiver is supplied over the same bidirectional transmission line 20 as is used for the VHF output. An rf choke 22 provides the low impedance path for the low voltage ac to the rectifier-regulator circuit 23.

The operation of the two-stage VHF amplifier circuit of FIG. 4 is straightforward and well known in the art. The interstage coupling network 53 is tuned to the frequency of the desired VHF output. As mentioned above, this frequency generally corresponds to the frequency of one of the locally unused commercial television channels. The bandwidth of the overall amplifier circuit is approximately 6 MHz which bandwidth corresponds to the standard television bandwidth. The Test Point 2 at the output of the second stage provides an attenuated output signal which can be used in conjunction with a standard television signal strength meter for alignment purposes. When not in use, Test Point 2 can be terminated in a matched load impedance.

Figure 5:
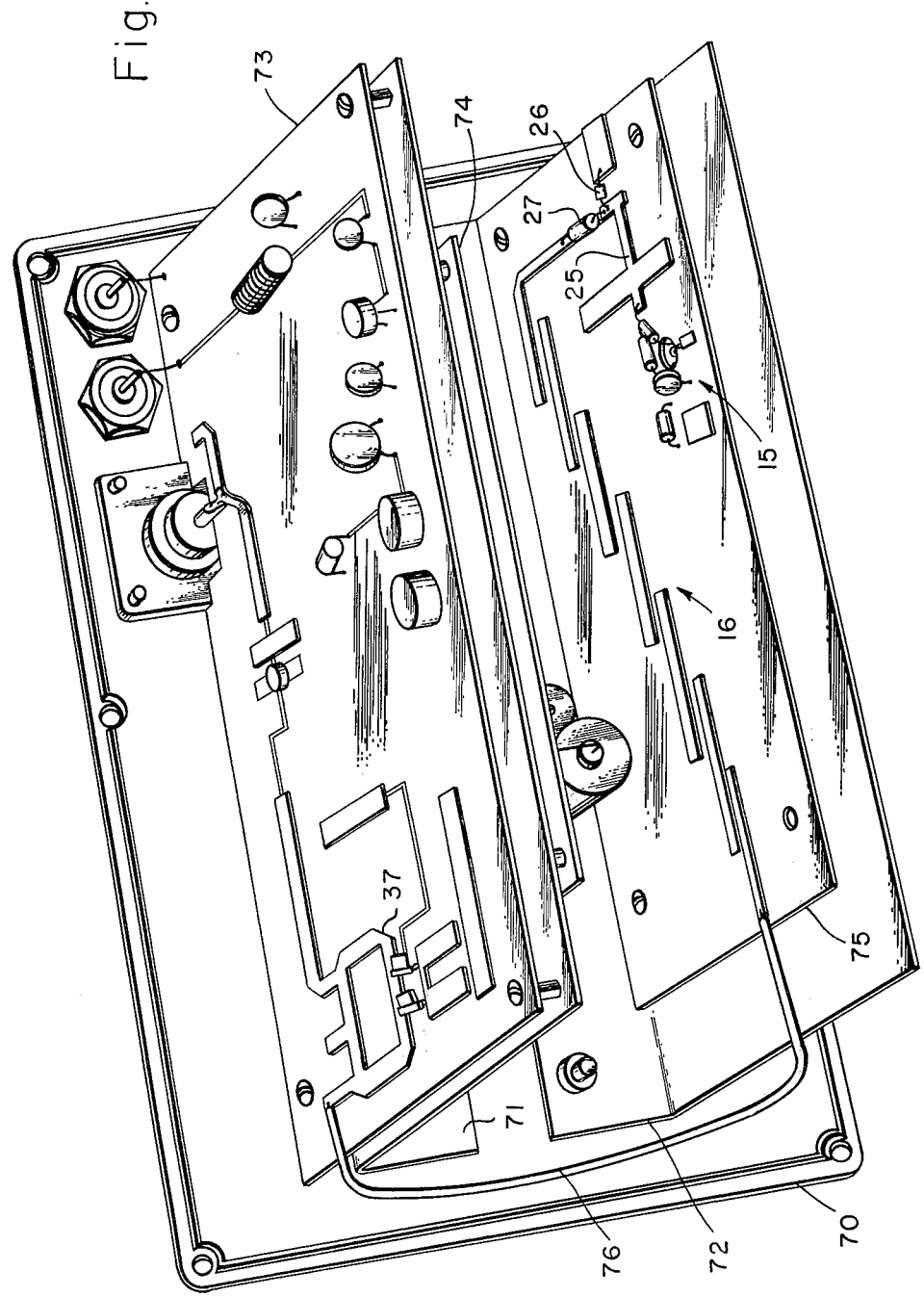
FIG. 5 is a pictorial drawing of an assembled receiver illustrating the construction details.

In FIG. 5 there is shown a pictorial diagram of an assembled receiver incorporating the novel features of the invention. Where appropriate, reference numerals have been carried over from the other Figures to designate like elements.

A Cover 70 is provided in FIG. 5 to which a pair of brackets 71 and 72 are bolted. A first dual-sided printed circuit board 73, which contains the rf preamplifier, mixer, trap filter and VHF amplifier circuits, is bolted to the top side of bracket 71. The Rectifier-regulator circuit is contained on a second printed circuit board 74 mounted to the bottom side of bracket 71.

A third printed circuit board 75 carrying the step recovery diode multiplier circuit and the five-pole coupled-line bandpass filter 16 is bolted to the top side of bracket 72. A length of coaxial transmission line 76 couples the output of the filter 16 to the local oscillator input of mixer hybrid network 37 on a board 73. A fourth printed circuit board not shown, containing the crystal oscillator and frequency multiplier circuitry can conveniently be mounted to the bottom side of bracket 72. An enclosure, also not shown, may be provided and affixed to the cover by means of machine screws, for example, to provide a weather tight receiver assembly.

In all cases, it is understood that the above-described embodiment is merely illustrative of but one of a number of the many possible specific embodiments which can represent applications of the principles of the present invention. Numerous and varied other arrangements can be readily devised in accordance with these principles by those skilled in the art without departing from the spirit and scope of the present invention.

What is claimed is:

1. A single conversion superheterodyne type microwave receiver for frequency translating signals applied from a microwave antenna comprising:
    input means for effecting an electrical connection to said microwave antenna;
    first amplification means electrically connected to said input means for amplifying the electrical signal received by said microwave antenna;
    a local oscillator including a step-recovery diode circuit and a first bandpass filter means, wherein said step-recovery diode circuit includes a crystal oscillator, a microstrip transmission line low-pass filter and matching structure and a step-recovery diode;
    mixing means for electronically mixing the output of said first amplification means with that of said local oscillator to produce a second electrical signal;
    second bandpass filter means electrically connected to said mixing means for passing predetermined frequencies of said second electrical signal to a second amplification means;
    said second amplification means being electrically connected to said second bandpass filter means and being adapted to amplify the output thereof to predetermined levels;
    power supply means for energizing said first and second amplification means, said mixing means, and said local oscillator; and
    output means for effecting an electrical connection through said power supply means between said second amplification means and a utilization device.

2. The receiver of claim 1 wherein said first bandpass filter means consists of a plurality of electromagnetically coupled parallel, coplanar sections of microstrip transmission lines disposed in a predetermined spatial relationship.

3. A superheterodyne type microwave receiver for frequency translating signals applied from a microwave antenna comprising:
    input means for effecting an electrical connection to said microwave antenna;
    first amplification means electrically connected to said input means for amplifying the electrical signal received by said microwave antenna;
    a local oscillator including a step-recovery diode circuit and a first bandpass filter means, said step-recovery diode circuit having a crystal oscillator, a microstrip transmission line low-pass filter and matching structure and a step-recovery diode, and said first bandpass filter means consisting essentially of a plurality of electromagnetically coupled parallel, coplanar sections of microstrip transmission lines disposed in a predetermined spatial relationship;
    mixing means for electronically mixing the output of said first amplification means with that of said local oscillator to produce a second electrical signal, said mixing means consisting essentially of a quadrature hybrid microstrip transmission line having a dual-diode balanced mixer configuration;
    second bandpass filter means electrically connected to said mixing means for passing predetermined frequencies of said second electrical signal to second amplification means;
    said second amplification means being electrically connected to said second bandpass filter means and being adapted to amplify the output thereof to predetermined levels;
    power supply means for energizing said first and second amplification means, said mixing means, and said local oscillator; and
    output means for effecting an electrical connection through said power supply means between said second amplification means and a utilization device.

* * * * *